United States Patent [19]

Derome

[11] Patent Number: 4,881,899

[45] Date of Patent: Nov. 21, 1989

[54] SUNSHINE SIMULATOR FOR SMALL SCALE MODELS

[76] Inventor: Jacques H. Derome, 168 du Béarn, St-Lambert, Quebec, Canada, J4S 1L1

[21] Appl. No.: 254,148

[22] Filed: Oct. 6, 1988

[51] Int. Cl.$^4$ .......................... G09B 9/00; G09B 25/04
[52] U.S. Cl. ...................................................... 434/72
[58] Field of Search ........................................... 434/72

[56] References Cited

U.S. PATENT DOCUMENTS

| | | | |
|---|---|---|---|
| 2,328,456 | 8/1943 | Humphreys | 434/72 |
| 3,068,574 | 12/1962 | Bieg | 434/72 |
| 4,470,820 | 9/1984 | Mori | 434/72 |

FOREIGN PATENT DOCUMENTS 367123 of 1932 United Kingdom .................. 434/72

OTHER PUBLICATIONS

"Solar Siter Charts the Sunlight" from *Popular Science* date ©late 1970s.
*Mechanisms, Linkages, and Mechanical Controls*, Chironis, ed., ©1965, pp. 114–115.

*Primary Examiner*—Edward M. Coven
*Assistant Examiner*—Valerie Szczepaik
*Attorney, Agent, or Firm*—Oblon, Spivak, McClelland, Maier & Neustadt

[57] ABSTRACT

A sunshine simulator and a method for using same for simulating sunshine on a small scale model attached to the simulator. The model is positioned on a support plateau which is pivotally attached to a support post for adjustable displacement of the plateau on a transverse pivot axis relative to the rays emitted from a remote beam emitting source, such as a light source, whereby to position the support plateau at a position relative to the light rays and corresponding to a desired earth latitude. The support post is pivotally secured to a base for axial rotation thereof on an inclined axis corresponding to the earth's inclination and its axis intersects the transverse pivot axis at an intersecting point whereby to position the support plateau at a position corresponding to a desired hour of the day. The base is rotationally secured to a stationary platform for rotation relative thereto on a rotation axis which is normal to the light rays and which intersects at the intersecting point whereby to position the support plateau at a position corresponding to a desired seasonal position of the earth with respect to the sun.

23 Claims, 5 Drawing Sheets

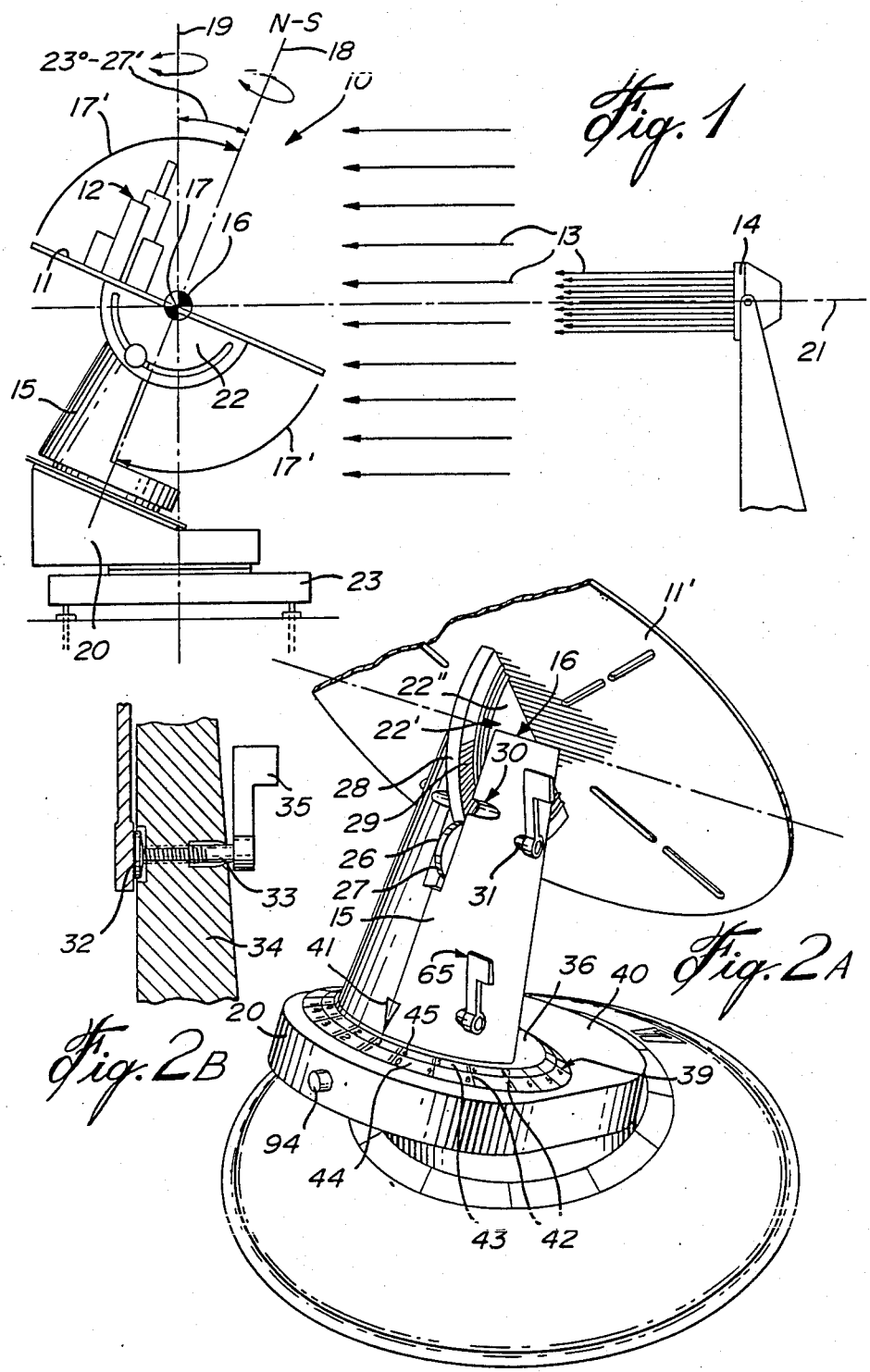

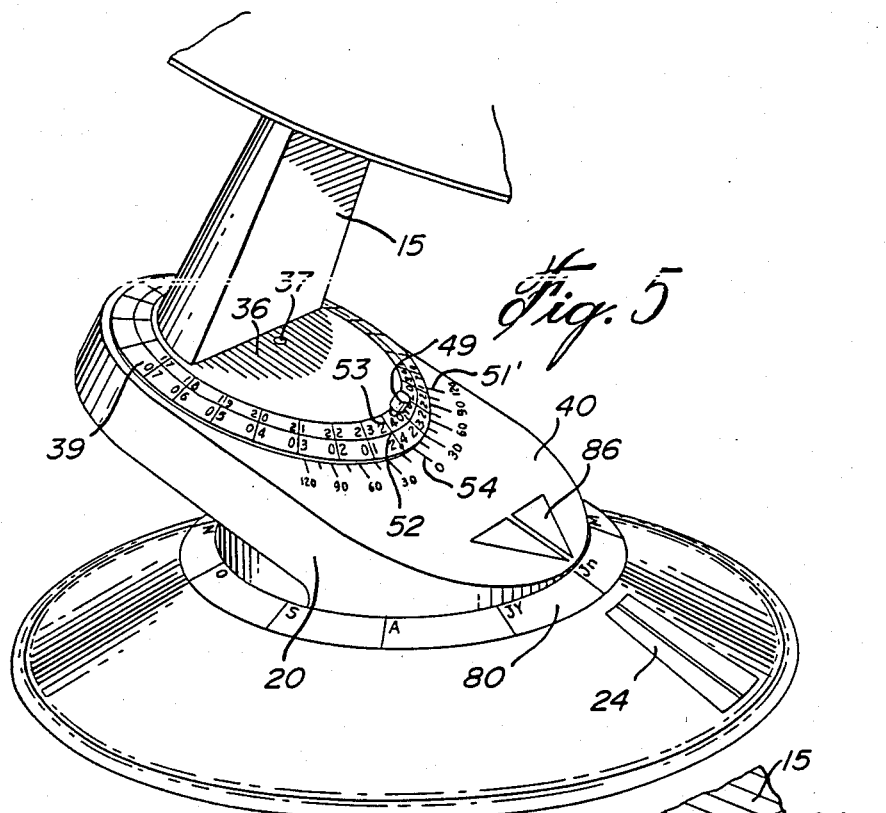
Fig. 5
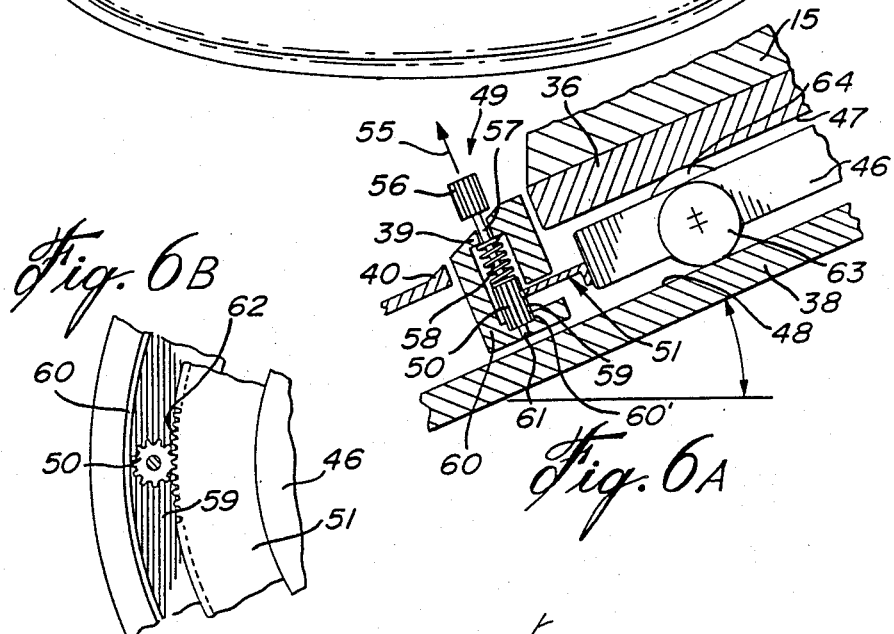
Fig. 6B
Fig. 6A
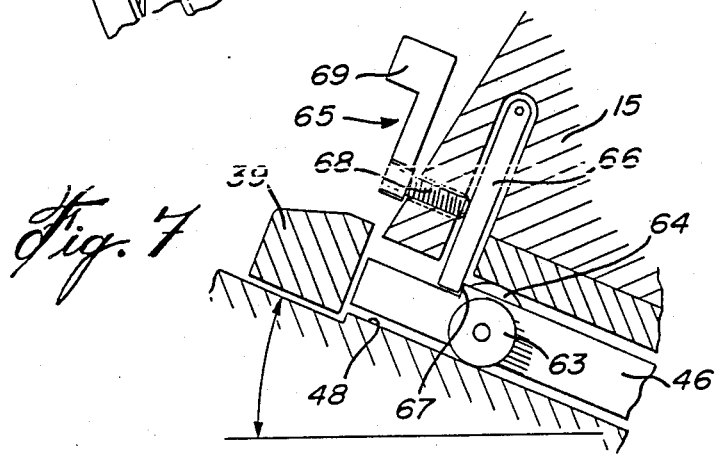
Fig. 7

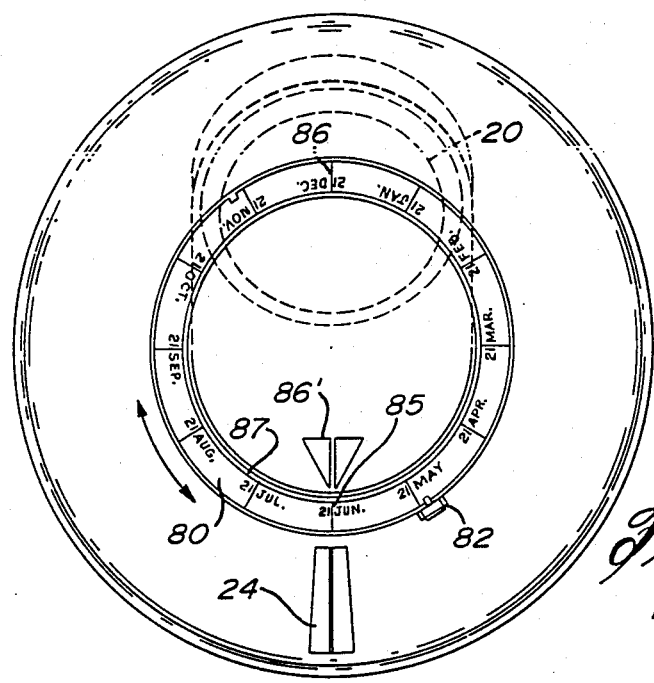
Fig. 8A
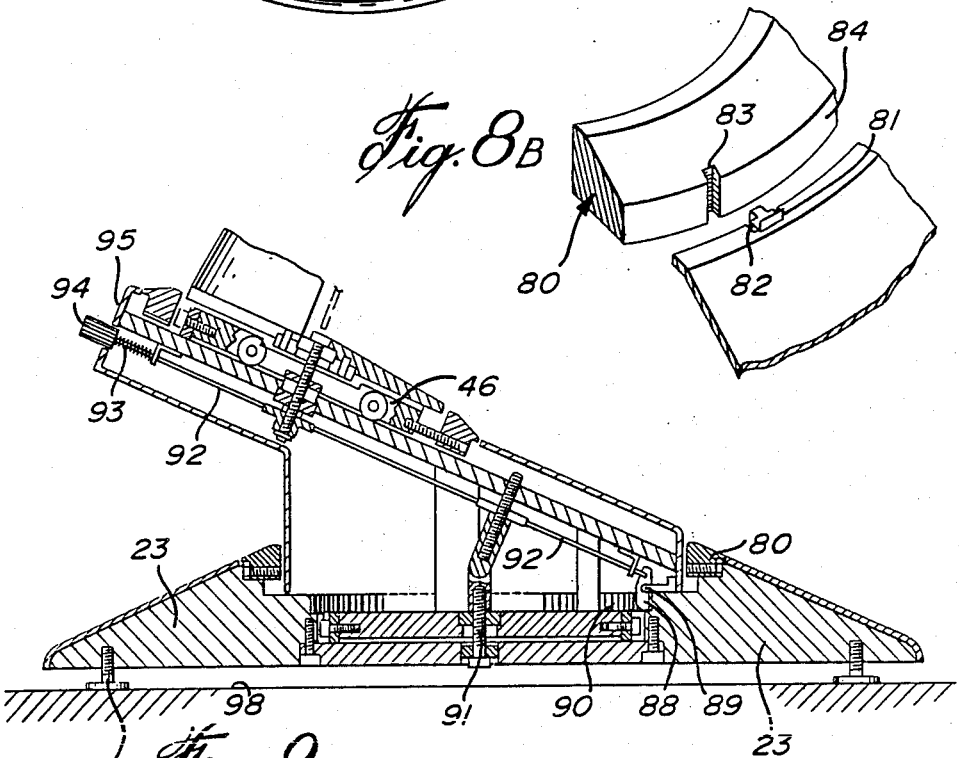
Fig. 8B
Fig. 9

SUNSHINE SIMULATOR FOR SMALL SCALE MODELS

BACKGROUND OF INVENTION

1. Field of Invention

The present invention relates to an improved sunshine simulator and method of operation and which is capable of simulating sunshine on a model attached to a plateau of the simulator, and further wherein the plateau is displaceable on three different connecting axis which are displaceable independently and which may be locked to one another.

2. Description of Prior Art

Sunshine simulators on which a model of an urban district or building is mounted so as to position the model at precise angles relative to a light source whereby to simulate lighting effects on the building or a cluster of buildings, and at a predetermined time and period of the year, are known. For example, such a simulator is described in U.S. Pat. No. 4,470,820 which issued on Sept. 11, 1984. Such known simulators are difficult and time consuming to adjust and often require adjustment each time one of the axes on which the model is supported is displaced. Often a control unit, such as disclosed in the above-referenced U.S. Patent, is required to manipulate, through motors and gears, the various axes of the device. Therefore, such devices become complex and expensive to produce and also very difficult to use. Still further, with the patented device there are two mechanical movements provided for three variable axes of displacement, which means that constant meticulous adjustment of the variables is necessary.

It is also known to displace a light source around a model along a predermined arc or straight post to simulate the altitude of the sun. Some other known systems do not provide a true analogy of the components of the different movements of the earth.

SUMMARY OF INVENTION

It is a feature of the present invention to provide an improved sunshine simulator which substantially overcomes all of the above-mentioned disadvantages of the prior art.

According to another feature of the present invention there is provided a method of simulating sunshine on a model structure secured to a support of a sunshine simulating device which substantially overcomes all of the above-mentioned disadvantages of the prior art.

Another feature of the present invention is to provide a sunshine simulator which is easy to operate and wherein the model is mounted on a platform which is adjustable on three independent axis, each operable independently and interlockable with one another whereby to make the device simple to use.

Another feature of the present invention is to provide an improved sunshine simulator which provides very precise simulation of sunshine on a model structure such as a model of a building or an urban district secured thereto, and wherein correction adjustments are provided for positioning the support platform on which the model is secured at a selected time zone position, mean time or savings time corresponding to a selected site for the building in either the northern or southern hemisphere of the earth.

According to the above features, from a broad aspect, the present invention provides a sunshine simulator which comprises model attaching support means pivotally attached to a support member for adjustable displacement on a transverse pivot axis relative to rays emitted from a remote beam emitting source whereby to position the support means at a position relative to the rays and corresponding to a desired earth latitude. The support member is pivotally secured to a base for axial rotation thereof on an inclined axis corresponding to the earth's inclination and intersecting the transverse pivot axis at an intersecting point whereby to position the support means at a position corresponding to a desired hour of the day. The base is rotationally secured to a stationary platform for rotation relative thereto on a rotation axis which is normal to the rays and which intersects at the intersecting point whereby to position the base and the support means at a position corresponding to a desired seasonal position of the earth with respect to the sun.

According to a still further broad aspect of the present invention there is provided a method of simulating sunshine on a model structure secured to a support means of a sunshine simulating device. The method comprises providing a light source and orienting same toward the device so that light rays will impinge normal to an axis intersecting point of the support means. A reference point which is provided on a stationary base of a device is positioned in the direction of the light source to orient the device. The support is displaced to a selected angular position corresponding to a desired earth latitude. The support means is also secured at that earth latitude. A support post which is secured at an inclined axis corresponding to the earth's inclination is axially rotated to a desired hour of the day position, as indicated by day markings at a reference location relative to the post. A season's indicator ring is also positioned to a desired season relative to the reference on the stationary base. The base supporting the post is displaced to a desired time in a season. The support post or the base may be independently rotated or rotated as a unitary structure to simulate sunshine on the model at different hours in a specific day, or a specific hour at different days, in a specific hemisphere.

BRIEF DESCRIPTION OF DRAWINGS

A preferred embodiment of the present invention will now be described with reference to the accompanying drawings in which:

FIG. 1 is a simplified side view illustrating the sunshine simulator device of the present invention positioned relative to a light source;

FIG. 2A is a fragmented perspective view showing the construction of the support port and its relationship with the dial member of the support plateau;

FIG. 2B is a fragmented enlarged view showing the break element associated with the support post;

FIG. 5 is a perspective view of the base showing the position of the hour indicating ring as well as the season indicating ring;

FIG. 6A is a fragmented section view showing the interconnection between the hour indicating ring and the intermediate stationary support frame;

FIG. 6B is a fragmented plan view showing the interconnection of the adjustment gear with the toothed flange of the intermediate stationary support frame;

FIG. 7 is a fragmented section view of a locking device for securing the support post to the intermediate stationary support frame;

FIG. 8A is a plan view showing the location of the season indicating ring relative to the stationary platform;

FIG. 8B is an exploded perspective and fragmented view showing the lock element for securing the season location ring at a selected hemispherical position;

FIG. 9 is a fragmented section view showing the base locking element for securing the base to the stationary platform.

DESCRIPTION OF PREFERRED EMBODIMENTS

Figure 3:
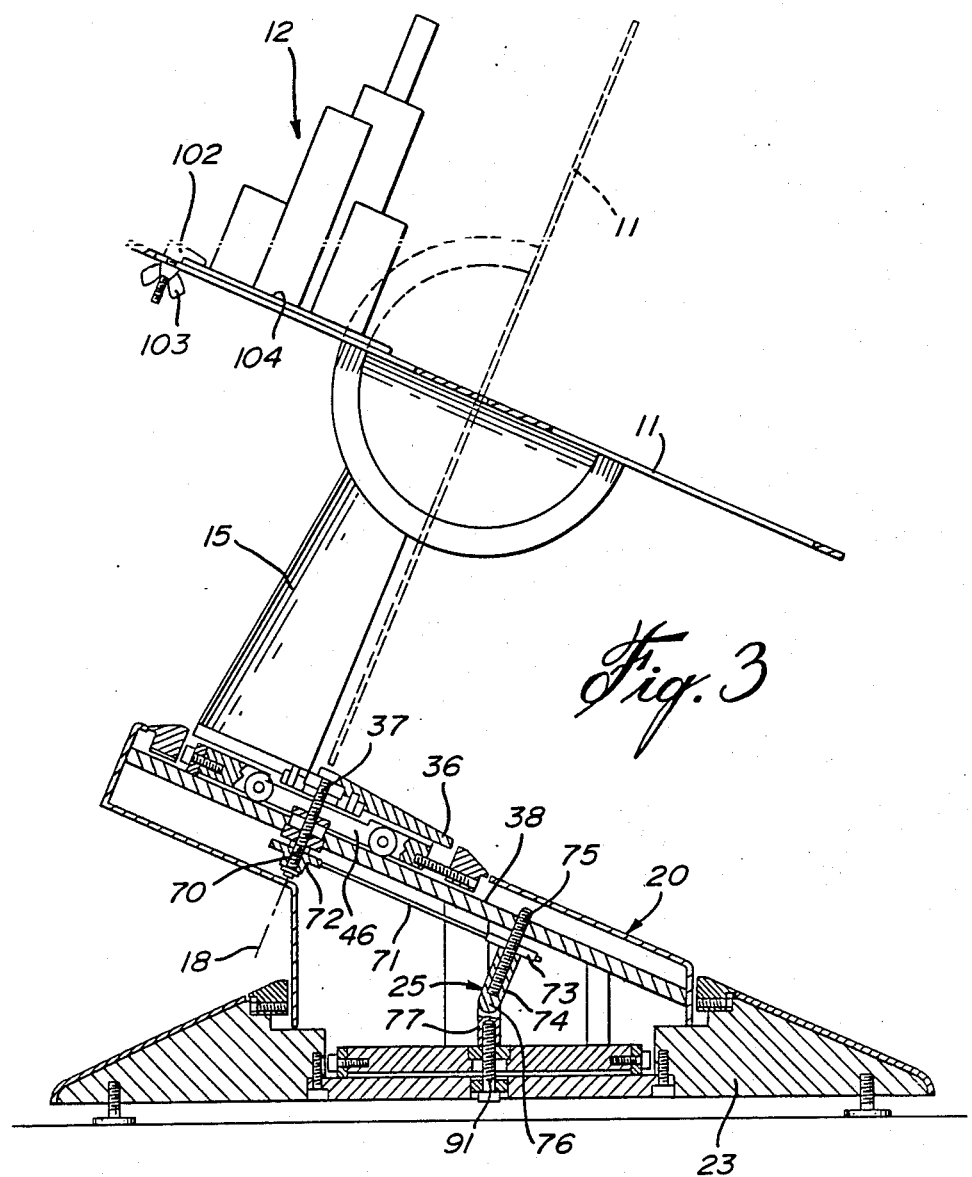
FIG. 3 is a cross-sectional side view of the sunshine simulator of the present invention.

Referring now to the drawings and more particularly to FIG. 1, there is shown generally at 10 the sunshine simulator device of the present invention. The simulator comprises a support means, herein a flat circular support plateau 11, on which is removably secured a model of a building structure or an urban district, or any other such model requiring a study of the effect of sunshine at any time of the year thereon. As herein shown, a model 12 is secured to the platform 11 and illuminated by light rays 13 emitted by a light source 14 positioned at a distance from the simulator device 10 and aligned therewith in a manner as will be described later.

The support plateau 11 is secured to a support post 15 on a transverse pivot connection 16 having an axis extending transverse to the light rays 13 and extending in a horizontal plane. The support plateau 11 is rotatable through an arc of 90°, on this connection 16 as indicated by arrow 17', and extending from the inclined axis 18 of the support post which passes through an intersecting point 17 located at the center of the plateau. This inclined axis 18 corresponds to the earth inclination and which lies at 23° 27' from the vertical axis which corresponds to the rotation axis 19 of a base 20 on which the support post is rotatably secured.

As herein shown, the light source 14 has its central light beam axis 21 oriented substantially in line with the center point 17 of the plateau 11 with the beams extending normal to the vertical rotation axis 19 of the base 20. It is also conceivable that the light source 14 could be replaced by other devices capable of an imprint on the support plateau to study the shading effects of light on the model 12. For example, a photosensitive film means be secured to the plateau and responsive to a light source or other beams to generate an imprint on the film.

The plateau 11 is also provided with a dial member 22 for providing precise angular positioning of the plateau 11 and corresponding to a desired earth latitude. Another embodiment of such dial member 22 will be described later with reference to FIGS. 2A and 2B. The base 20 is also rotatably secured to a stationary platform 23 which is provided with a reference marking 24 (see FIG. 5), which reference marking is oriented in alignment with the location of the light source 14. Once the stationary platform is aligned, it remains stationary.

Referring now additionally to FIGS. 2A and 2B, there is shown the construction of the support post 15 and, as herein shown, a dial member 22' is secured to the bottom face 11' of the support plateau 11 and extends transversely thereof. The dial member 22' has an adjustment element 26 engaged therewith by a toothed peripheral edge 27 in meshing engagement with an internal toothed ring segment 28 secured to the dial member 22'. A gauge in the form of degree markings 29 is provided on the outer arcuate edge portion of the dial member 22' to indicate the angle of the plateau relative to the rotation axis 18. A reference pointer 30 is provided on the support post 15 adjacent to the gauge 29 to indicate the angular position of the plateau on its transverse pivot axis 16. Arresting means in the form of a brake element 31 is secured to the support post 15 adjacent the dial member 22' and is provided with an internal friction pad 32 which is displaceably positioned for frictional engagement with the arcuate plate 22" of the dial member to arrest the dial member at a selected desired angle. The brake element is better shown in FIG. 2B, and is constituted by a threaded shaft 33 extending in a wall portion 34 of the support post 15 and having a finger engaging arm 35 to impart rotation to the shaft 33 to position the friction pad 32 against the dial member 22' or away from it.

Referring now additionally to FIGS. 2A, 3 and 5 to 7, it can be seen that the support post 15 is provided with a bottom transverse circular foot portion 36 which is secured by a pivot connection or pivot pin 37 (see FIG. 3) for rotation on the fixed inclined axis 18 and disposed over an incline support wall 38 of the base 20. Dial means in the form of an hour indicator ring 39 is disposed about the circular foot portion 36 and a peripheral edge portion 40 of the base 20 to position the support post at a desired hour of day by rotating the post 15 to position the reference mark 41 at the selected hour marking 42 on the ring 39 (see FIG. 2A).

As shown in FIG. 2A the hour indicator ring 39 is segmented into two sections, a first section 43 indicative of hours in the northern hemisphere of the earth and a second section 44 indicative of hours in the southern hemisphere of the earth. Accordingly, if the support post 15 is to be positioned at the 7th hour in the northern hemisphere, it is disposed between the 7th hour marking 45 in the first section 43 of the ring 39. The numbers in the northern hemisphere extend in a clockwise direction while the numbers in the southern hemisphere extend counterclockwise.

As shown in FIGS. 3 and 6A the support post 15, or more precisely the circular foot portion 36 of the support post, is disposed over an intermediate stationary support frame 46 which is located between an underside or lower face 47 of the foot portion 36 and a top side 48 of the inclined support wall 38. An adjustment means 49 in the form of a displaceable gear 50 is in toothed engagement with a toothed flange 51 which is secured to the intermediate stationary support frame 46 for displacing the hour ring 39 relative to the circumferential portion 40 of the inclined wall.

Degree markings 51' are provided on a segment of the circumferential portion 40 and a pointer 52 is provided on the ring 39 at the 24-hour marking 53 for adjusting the ring 39 relative to the minute markings. The minute markings 51 total up to 2 hours on each side of the reference pointer or the 0 minute mark 54 to permit adjustment of the ring up to a maximum of 2 hours in the northern or southern hemispherical segment.

The adjustment of the ring is to provide a correction factor for the support plateau whereby to substantially precisely dispose the plateau to a position corresponding to the position of the selected site around the world in a selected time zone, and at the mean time or savings time. Once this adjustment is effectuated, the ring is locked to the intermediate stationary support frame 46 which is itself secured to the stationary base 23, as will be described later.

In order to provide the adjustment of the ring 39, the gear 50 is axially displaced upwardly in the direction of arrow 55 by pulling on the top finger engaging head 56 thereby pulling the shaft 57 secured to the gear upwardly against the downward spring-biasing action of the coil spring 58, thereby lifting the gear 50 out of a bottom channel 59 which is provided with a toothed hole 60' thereof to lock the ring to the flange 51. By lifting the gear 50 it remains in engagement with the flange 51 with the bottom end 61 of the shaft 57 still engaged in the bottom of the channel 59 so that the adjustment means 49 is stationary relative to the ring, and the ring displaces itself along the toothed section 62 of the flange 51. Thus, by imparting axial rotation to the gear 50 in its lifted position, the ring is displaced, and when the pointer 52 is at the proper minute marking in its selected hemispherical section of the markings 51' the finger engaging head 56 is released, making sure that the gear 50 is engaged with the teeth 60' in the bottom channel 59 to lock the ring to the support frame 46.

If, for example, the specific region to be simulated by the model was in a time zone having savings time, then the ring 39 would be displaced by 1 hour. Also, if the specific location being simulated is spaced from the demarkation line of the time zone, then another adjustment is necessary to compensate for the degree displacement of the location in the time zone, and this correction is a four minute displacement for every onedegree displacement in the time zone. Thus, substantially precise positioning of the plateau is available to compensate for these practical interpretations due to location of site in a designated time zone, and also due to savings time.

Figure 10:
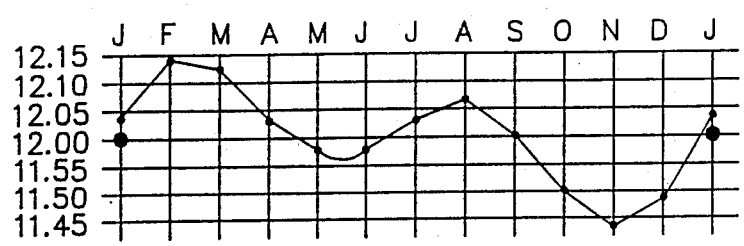
FIG. 10 is a Table illustrating the variations in degrees of a specific location on earth taking into consideration the time equation resulting from a combination of the elliptical path of the earth around the sun and the angle of the earth with respect thereto.

A third adjustment which can be made with the sunshine simulator of the present invention is to compensate for the variation in minutes from the actual clock time for each day of the year resulting with respect to variations due to the ecliptic path of the earth around the sun and the inclined axis of the earth. There is a variation of +14.5 minutes −16.5 minutes during a complete year cycle as illustrated by the chart in FIG. 10 where the variations are illustrated with respect to the 12-o'clock position.

As shown in FIGS. 3, 6A and 7, the intermediate stationary support frame 46 is held spaced from the lower surface 47 of the foot portion 36 of the post 15 and the top side 48 of the inclined wall 38 by support wheels 63 and 64 respectively engageable with the inclined wall 38 or the lower face 47 of the foot portion 36 of the post 15. Accordingly, the inclined wall 38 may be displaced relative to the support frame 46 as well as the post 15 and about the pivot pin 37.

As shown in FIG. 7 a post locking device 65 immovably locks the support post 15 to the intermediate stationary support frame 46 and hence to the stationary support platform 23 so that only the base 20 can be made rotatable or displaceable, as will be described later. This lock means 65 is provided by a brake rod 66 engageable about a friction edge 67 of the support frame 46 and held thereagainst by an adjustable lock screw 68. By unscrewing the screw 68 by means of the handle member 69, the break rod 66 releases its frictional engagement with the edge 67 and the post 15 is free to rotate on its pivot pin 37.

The pivot pin 37 is secured at a bottom end 70 thereof, as shown in FIG. 3, to a link belt 71 which is trained about a first sprocket 72 secured to the bottom end 70 of the pivot pin 37, and a second sprocket 73 secured to an upper flexible link member 74 of an articulated pin 75. The articulated joint 76 of the pin 75 connects the top portion 74 to a fixed bottom portion 77 secured to the stationary platform 23. The flexible link connection may also be provided by a gear train (not shown) consisting of a plurality of gears disposed on stationary shafts oriented at different angles from one another to effectuate the connection between the rotational axis of the support post 15 and that of the stationary support frame 23, which lie at different angles.

Referring now to FIGS. 8A, 8B and FIG. 9, it can be seen that a season indicating ring 80 is displaceably or rotatably positioned about the base 20. The ring 80 is representative of the seasons in both the northern hemispherical sector and the southern hemispherical sector, and is oriented with respect to the reference marking 24 by retracting a tab portion 81 of a lock element 82 engageable in one of two locking cavities 83 provided in the outer peripheral edge 84 of the ring 80. This is usually the first adjustment which is made to the device when in use after the reference marking 24 and the stationary platform have been oriented in the direction of the light source. This adjustment locates the selected location to be simulated in its proper hemisphere. As can be seen in FIG. 8A when the ring is positioned to its marking designated "January 21", namely marking 85, the opposed marking in the southern hemisphere, namely marking 86, indicates "December 21". Now that this adjustment is done the base 20 can be rotated for adjustment to the day in the selected season to be simulated by positioning its pointer 86 at the precise day marking 87 to be simulated. Once this marking is positioned, the base 20 may be locked to the support platform by means of a base locking element, herein a hinge lock bar 88 secured on a pivot connection 89 and actuable in and out of engagement teeth 90 provided in a stationary circumferential wall or ring of the stationary platform about the pivot pin 91 and actuable by a link rod 92 spring-biased by spring 93 to an engaged position. By pushing the button 94 through the housing wall 95, the lock bar 88 is pivoted out of engagement with the teeth 90 and the base may be rotated.

As soon as the button is released the lock bar 88 will find its position in one of the notches 90, There is provided a notch for each day of the year. If the adjustment is not to be so precise, there could be provided a notch, say for every second day in a year, as this can facilitate the construction of the device. The stationary platform 23 is also provided with adjustable legs 96 to maintain the base horizontal or level and to provide good frictional contact on a support surface 98 to prevent displacement of the simulator with respect to the light source 14.

Figure 4:
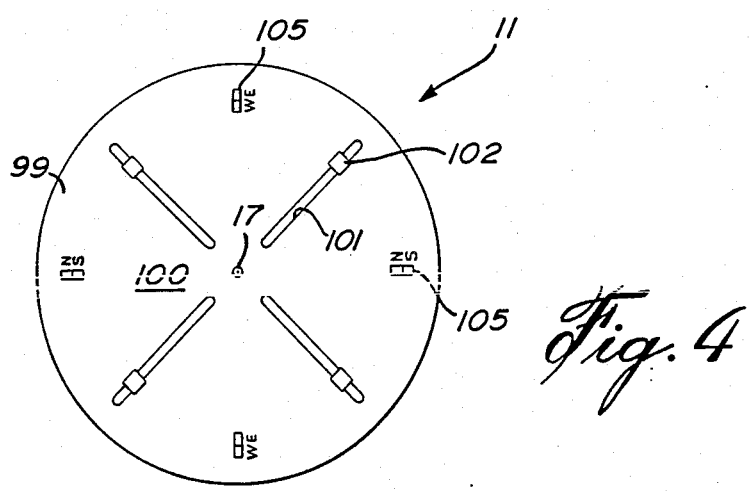
FIG. 4 is a plan view of the support plateau.

Referring now to FIG. 4 there is shown one embodiment of construction of the support plateau 11. As herein shown the plateau is constituted by a flat disc 99 having a flat top surface 100 provided with diametrically opposed slots 101 in which there is displaceably secured an attachment shoe 102 having a wing nut 103 (see FIG. 3) secured under the platform to fix the shoe 102 on a support base 104 of the model 12. The top face 100 of the plateau 11 is also provided with markings 105 which indicates the earth coordinates for both the northern and southern hemispheres. These are all disposed symmetrically about the central intersecting point 17 of the device.

Summarizing briefly the operation of the sunshine simulator 10 of the present invention, a model is attached to the support plateau and a light source 14 is provided in alignment with a reference marking 24 on the stationary platform of the simulator, or vice versa. The geographical location to be simulated by the model is determined so that the plateau may be adjusted to correspond pond to the earth's latitude at that selected location, and it is tilted on its transverse pivot axis 16 until the dial member indicates the degree of the selected latitude, the plateau is then locked in position by the brake element 31.

The hour indicating ring 39 is then displaced by means of the adjustment device 49 to correct the position of the base with respect to the position of the selected area within a specific time zone, the mean time and the savings time, if required. The support post is then rotated to the selected time of day to be simulated in either the upper or lower hemisphere, as indicated in the respective sections 43 and 44 of the hour indicating ring 39. The support post may then be locked in that position, if desired, by the locking element 65.

The season indicating ring 80 is positioned to the proper hemispherical position of the selected site and retained in that position by the locking element 82 and is not displaced after this setting. The support base 20 is now freely rotatable about the ring 80 whereby the model can be displaced throughout every day of the year and simulating sunshine at the hour that the support post has been fixed. This is done by pushing the lock release knob 94 inwardly of the housing while rotating the base.

Alternatively, the base 20 may be placed at a selected day in the year as indicated on the ring 80 and locked in that position by releasing he knob 94, while the support post 15 remains unlocked from the stationary support frame 46 by releasing the brake member 65. Thus, the post is freely rotatable on its rotation axis 18, and by rotating it around the ring the effects of sunshine on the model throughout the sunshine period of the day selected on the season ring is simulated. Of course, when it is night time the plateau will conceal the model and the light rays will not impinge thereupon.

It can be seen that with the simulator of the present invention, after the support plateau is oriented at the desired angle corresponding to the latitude of the location to be simulated, both the support post 15 and the base 20 can be displaced independently or interlocked with one another and displaced in unison. Also, the season indicating ring and the time indicating ring provide for substantially precise simulation of sunlight during a specific day at a specific location in the northern or southern hemisphere, and only two members need to be displaced as the three independent axes are all interconnected and all intersect at the center point of the support plateau.

It is within the ambit of the present invention to cover any obvious modifications of the preferred embodiment described herein, provided such modifications fall within the scope of the appended claims.

I claim:

1. A sunshine simulator comprising model attaching support means pivotally attached to a support member for adjustable displacement on a transverse pivot axis relative to horizontal light rays emitted from a non-displaceable remote beam emitting source whereby to position said support means at a position relative to said rays and corresponding to a desired earth latitude, said support member being pivotable secured to a base for axial rotation thereof on an inclined axis corresponding to the earth's inclination and with its axis of rotation intersecting said transverse pivot axis at an intersecting point whereby to position said support means at a position corresponding to a desired hour of the day, said base being rotationally secured to an inclined support wall pivotally secured to a stationary platform for rotation relative thereto on a rotation axis which is normal to said rays and which intersects at said intersecting point whereby to position said support means at a position corresponding to a desired seasonal position of the earth with respect to the sun, and dial means disposed between said support member and an adjacent circumferential portion of said inclined support wall to position said support means at a desired hour of day, said dial means being stationary relative to a light source position reference marking on said stationary platform.

2. A sunshine simulator as claimed in claim 1 wherein said model attaching support means is a support plateau, said intersecting point being a center point of said plateau.

3. A sunshine simulator as claimed in claim 2 wherein there is further provided a lamp constituting said beam emitting source and fixed remote from said plateau and having a central light beam axis oriented substantially in line with said center point of said plateau.

4. A sunshine simulator as claimed in claim 2 wherein said plateau has a dial member secured thereto, said dial member having an adjustment element engaged therewith for displacement of said dial member and said plateau about said transverse pivot axis, gauge means associated with said dial member for indicating the angle of said plateau relative to said rotation axis, and arresting means to lock said dial member and plateau to said support member at a selected desired angle.

5. A sunshine simulator as claimed in claim 4 wherein said dial member is an arcuate plate secured transversely to a bottom surface of said plateau, said guage means being constituted by degree markings disposed adjacent an outer arcuate edge portion of said arcuate plate and a reference point disposed on said support member.

6. A sunshine simulator as claimed in claim 4 wherein said arresting means comprises a brake element secured to said support member and having a friction pad displaceably positioned for frictional engagement with said arcuate plate to arrest said plate at said selected desired angle.

7. A sunshine simulator as claimed in claim 4 wherein said adjustment element is a finger engaging wheel having a gear coupled to a meshing arcuate gear rack secured to said arcuate plate.

8. A sunshine simulator as claimed in claim 2 wherein said plateau is a flat disc having a top model support surface, fastening means secured to said flat disc for attaching a model thereto, and markings indicating the earth's coordinates for both hemispheres.

9. A sunshine simulator as claimed in claim 2 wherein said support member is a support post having a transverse circular foot portion secured by a pivot connection to said inclined support wall of said base, dial means disposed between said support member and an adjacent circumferential portion of said inclined support wall to position said support means at a desired hour of day, said dial means being stationary relative to a light source position reference marking on said stationary platform.

10. A sunshine simulator as claimed in claim 9 wherein said dial means comprises a displaceable hour ring, said support post being alignable with a selected time marking on said ring, said time markings corresponding to a north and south hemisphere latitude position, and extending respectively in opposed clockwise or counter-clockwise directions.

11. A sunshine simulator as claimed in claim 9 wherein said pivot connection comprises an intermediate stationary support frame disposed between an underside of said foot portion and a top side of said inclined wall, adjustment means engageable with said stationary support frame and said hour ring for adjusting said ring to a position corresponding to a selected time zone position, mean time or savings time.

12. A sunshine simulator as claimed in claim 11 wherein said adjustment means has a displaceable gear in toothed engagement with a toothed flange secured to said stationary support frame for displacing said hour ring relative to said circumferential portion of said inclined wall, degree markings on a segment of said circumferential portion, a pointer on said ring at a 24-hour mark for adjusting said ring relative to said degree markings, and engagement means to lock said displaceable gear with said hour ring.

13. A sunshine simulator as claimed in claim 12 wherein said degree markings correspond to two hours to each side of a reference pointer disposed on said base adjacent a season indicating displaceable ring intermediate said base and said stationary platform.

14. A sunshine simulator as claimed in claim 12 wherein said engagement means is a peripheral locking channel bottom wall in said ring having a plurality of arresting teeth to engage said displaceable gear when positioned in said locking channel.

15. A sunshine simulator as claimed in claim 14 wherein said displaceable gear is axially displaceable on a gear shaft for moving said gear axially in and out of said locking channel, said gear shaft having a top finger engaging head extending outwardly of said hour ring to impart axial rotation of said gear to displace said hour ring relative to said degree markings.

16. A sunshine simulator as claimed in claim 11 wherein said intermediate stationary support frame is held spaced from said underside of said foot portion and said top side of said inclined wall by idle wheels so that both said support post and said inclined wall are independently displaceable relative to said stationary support frame.

17. A sunshine simulator as claimed in claim 16 wherein a pivot pin retains said foot portion of said support post over said stationary support frame and maintains said support frame sandwiched at a stationary position, said pivot pin being secured to said stationary platform by a link means.

18. A sunshine simulator as claimed in claim 17 wherein said link means is comprised by a link belt trained about a first sprocket secured to said pivot pin and an articulated pin secured fixed to said stationary platform.

19. A sunshine simulator as claimed in claim 17 wherein said link means is provided by a gear train coupled between a gear fixed to said pivot pin and a gear fixed to a post secured to said stationary platform.

20. A sunshine simulator as claimed in claim 10 wherein there is further provided post locking means to immovably lock said support post relative to said hour ring whereby said support plateau may be held at a fixed time while displaced by said base to orient same to different positions of the seasons.

21. A sunshine simulator as claimed in claim 13 wherein said season indicating ring is a rotatable ring displaceable with relation to a light ray orienting reference point provided on said stationary platform and aligned in the direction of said light rays, said reference point indicating opposed seasons of said north and south hemispheres.

22. A sunshine simulator as claimed in claim 21 wherein said base is secured to a rotation disc rotatably secured about a pivot pin disposed coextensively with said rotation axis so as to place said base at substantially a desired day of a desired month of a selected season of said selected hemisphere.

23. A sunshine simulator as claimed in claim 22 wherein there is provided arresting lock means to secure said rotatable ring with respect to said stationary platform and said reference point at a desired one of two opposed reference days of opposed seasons.

* * * * *